United States Patent Office 3,341,773
Patented Sept. 12, 1967

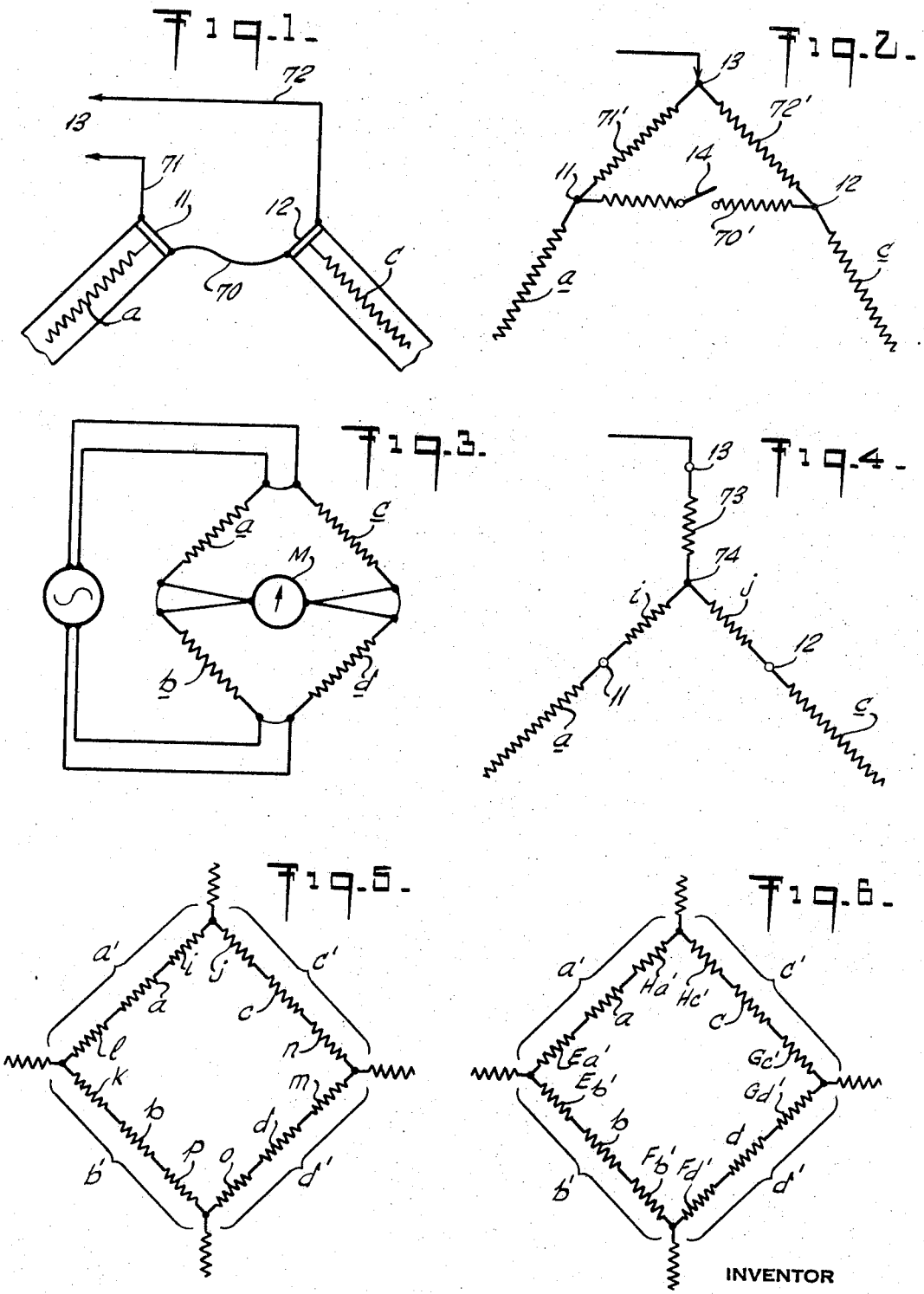

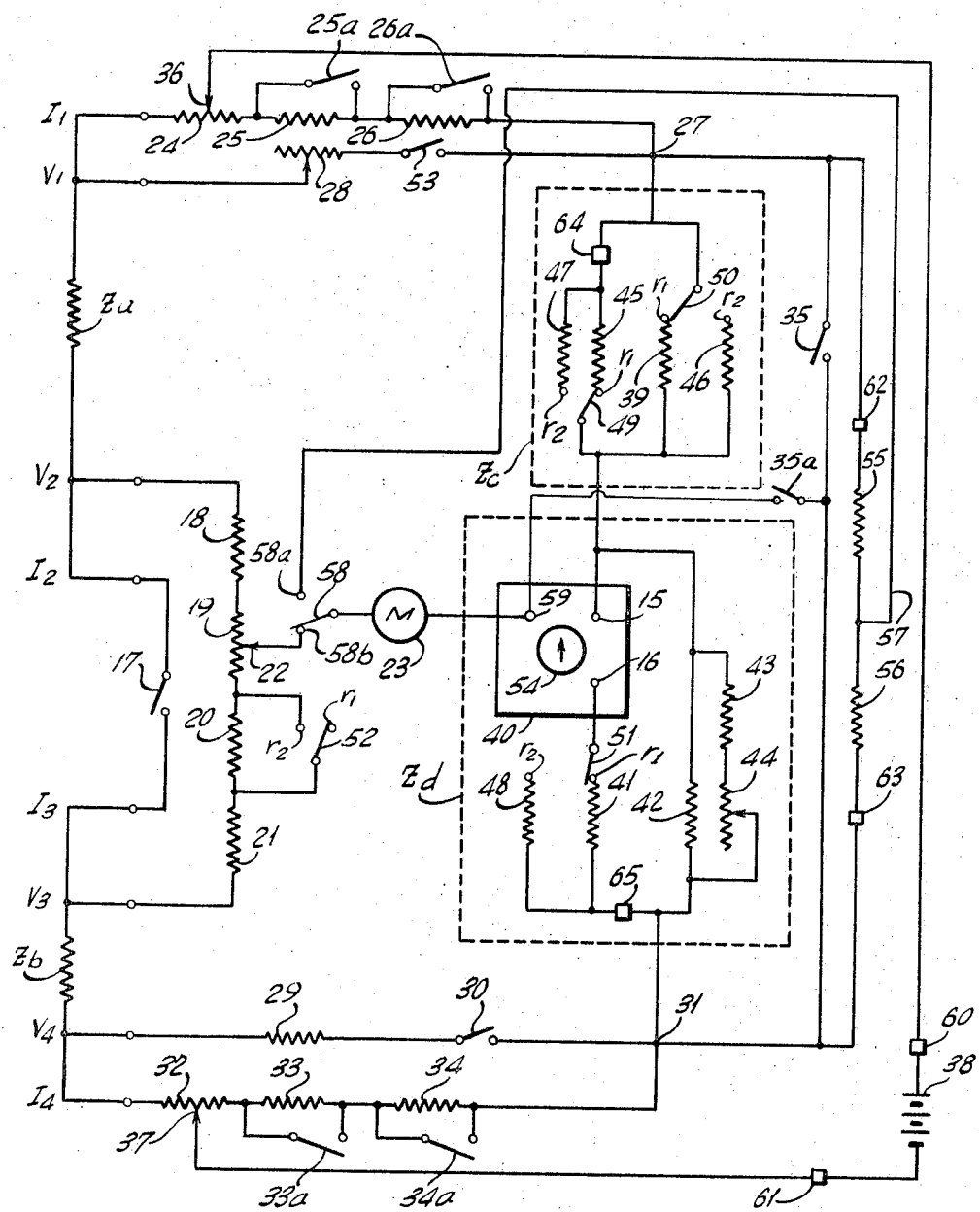

3,341,773
IMPEDANCE MEASURING BRIDGE UTILIZING DELTA BRIDGE NETWORKS FOR BALANCING OUT SPURIOUS EFFECTS
Loebe Julie, New York, N.Y., assignor to Julie Research Laboratories, Inc., New York, N.Y., a corporation of New York
Continuation of application Ser. No. 394,932, Sept. 8, 1964. This application June 22, 1966, Ser. No. 559,694
4 Claims. (Cl. 324—57)

This application is a continuation of application Serial No. 394,932, filed Sept. 8, 1964, now abandoned.

The instant invention relates to improvements in a direct reading ratio set and, in particular, a network comprising a multi-arm measuring bridge having a three terminal voltage divider as one arm of the bridge.

As known in the art, a direct reading ratio set is made up of a combination of fixed and adjustable resistors arranged in the form of a Wheatstone measuring bridge. Two arms of the bridge are selected to form the ratio set to provide extremely accurate ratio arms for comparison measurements and substitution tests of resistors. In the conventional ratio set, a first arm is usually selected to be a fixed value of 100 ohms; the second arm is a variable resistance providing discrete steps from about 99.445 ohms to 100.555 ohms.

In one method of using such bridge, an auxiliary resistor of the same nominal value as the resistors under comparison serves as the third bridge arm. The resistors under test are interchangeably connected into the fourth arm wherein the bridge is balanced separately each time the fourth arm resistor is changed. The bridge is balanced by varying the ratio of the variable arm with respect to the fixed arm. The difference in the ratio for two balances gives the percentage difference between the two fourth arm resistors under test. Thus, if the difference in the ratios for the two balances is one step on the 0.001 dial of the movable arm, one resistor is 0.001% different than the other. For example, if 1,000-ohm resistors are compared, the difference of 0.001% of 1,000 ohms is 0.01 ohm.

In another method of prior art bridge operation, the standard is placed in the third arm and the unknown of nominal and similar value to the standard is placed in the fourth arm. A balance is obtained and then the positions of the standard and unknown are interchanged, whereby a second balance is obtained. The two balances are averaged to determine the percentage variation of the unknown with respect to the standard.

When the unknown and standard resistors under comparison are characterized by low values of resistance, for example, values less than 100 ohms, and where extremely high precision comparison results are desired, contact, lead wire and bridge loading effects present formidable problems which make high precision comparison measurements in the order of a few parts per million difficult, if not impossible, to obtain. The four terminal connection is often used to minimize the spurious effects of lead and contact resistances. However, when employing four terminal yokes in the conventional ratio set circuits, a variety of numerous balances are required. As a simple example, first balances using current terminals are made, then balances using voltage terminals are made and then each of the voltage terminals at the standard interconnections are made. The number of balances required for a complete comparison measurement in accordance with the prior art systems becomes unduly involved, particularly, where a large number of resistors are required for comparison measurements.

Additional problems arise when measurements of resistors within accuracies of a few parts per million (p.p.m.) are attempted. In the first place, the state of the art bridges do not provide such accuracies with sufficient reliability and consistency. For example, even after a state of the art bridge is suitably calibrated, a 1 milli-ohm variation in contact resistance, as one is interchanging the resistors under measurement, will introduce an error of 10 parts per million with respect to the measurement of 100-ohm resistors, and it is recognized that variations in contact resistances of 1 milli-ohm are not uncommon.

My co-pending application Serial No. 195,680, filed May 18, 1962, now Patent No. 3,179,880, issued Apr. 20, 1965, and entitled "Impedance Measuring Apparatus" illustrates and claims a three-terminal voltage divider in a closed loop bridge for providing high accuracy precision resistor measurements within the absolute value of 1 or 2 parts per million.

It is the principal object of the instant invention to extend the application of the invention set forth in the aforesaid application as a direct reading ratio set.

It is a further object of the invention to provide a closed bridge loop direct reading ratio set employing a three terminal voltage divider as contemplated in the aforesaid application as one arm of the bridge and incorporating composite lead, contact and load compensation yokes at two sensitive junctions of the bridge so as to balance out all spurious effects that might arise during bridge balance measurements, wherein resistance comparisons and measurements in the order of 1 part per million in absolute values are achieved.

It is a further object of the invention to provide a direct reading ratio set which is automatically self-calibrating with respect to its fixed resistor arm and the variable arm comprising the three terminal voltage divider while the sensitive low impedance circuit of the bridge is completely isolated therefrom during such calibration to thereby increase the precision and accuracy of the bridge calibration.

It is a further object of the invention to provide a direct reading ratio set as described hereinbefore capable of automatic and self-compensation against lead, contact and other yoke effects at the sensitive junctions of the bridge, wherein variations of any of such spurious effects during bridge use are automatically divided into suitable bridge arm ratios as the bridge is actually being balanced, so as to eliminate any errors that otherwise would be introduced by such spurious effects.

It is a further object of the invention to provide a bridge measuring system as contemplated herein for providing a direct 1:1 range of ratio measurements and by mere switching operation an equally accurate 10:1 range of ratio measurements.

It is a further object of the invention to provide a direct reading ratio set for accurate high precision ratio measurements, wherein the readings of bridge balance will indicate at least to 1 part per million the actual difference of the resistor under test with respect to a standard.

It is a further object of the invention to provide a direct reading ratio set, wherein the low resistance sensitive portion of the circuit is isolated against physical change and variations during bridge operation, and such sensitive portion of the system remains physically constant during bridge operation so as to minimize contact, lead and load resistance effects.

Further objects and advantages will become apparent from the following description of the invention taken in conjunction with the figures, in which:

FIG. 1 illustrates schematically a four terminal connection between two resistors at a junction of a closed bridge loop;

FIG. 2 illustrates schematically the equivalent electrical circuit of FIG. 1;

FIG. 3 is a schematic of a Wheatstone bridge circuit employing four terminal connections at the junctions thereof;

FIG. 4 is an expanded Y formation of the delta formation illustrated in FIG. 2;

FIGS. 5 and 6 illustrate expanded Y formations at the four junctions of the bridge depicted in FIG. 3; and FIG. 7 is an electrical schematic of a direct reading ratio set in accordance with the invention.

Four terminal lead connections are employed when dealing with high precision and extreme accuracy measurement and calibration circuitry with respect to resistors characterized by low values of resistance. Four terminal lead connections serve to minimize the error effects of suprious lead wire and terminal contact resistances. My co-pending application Ser. No. 562,045, filed June 6, 1966 and entitled "Accurate Impedance Measuring Apparatus" depicts a four terminal connection as applied to resistors in a bridge. Reference may be made to said application for further details concerning such connections.

The instant invention contemplates the use of a closed loop direct reading ratio bridge adapted for the precision measurement and calibration of low value resistors. The four terminal junction connection forms a yoke. FIG. 1 illustrates such connection at the junction of two resistors $a$ and $c$ of a bridge. Reference numbers 11 and 12 depict the conductive terminal ends of the resistors. Reference 13 depicts the connection to the common junction with the bridge cross-arm connected to resistors $a$ and $c$. Line 70 depicts one lead connection of the four-terminal yoke between said two resistors. Lines 71 and 72 depict the respective second connections from each resistor $a$, $c$ to the common junction 13 of one of the bridge cross-arms. The equivalent schematic circuit of FIG. 1 is depicted in FIG. 2. The end of resistor $a$ is at point 11. The end of resistor $c$ is at point 12. The common connection or tap to the cross-arm of the bridge is depicted at 13. The resistances 70', 71' and 72' depict the respective equivalent resistances corresponding to the actual contact and lead wire resistances generated by the yoke terminal connection at the junction of resistors $a$, $c$. As seen from FIG. 2, the yoke formed at the junction of resistors $a$ and $c$ is a delta formation. Merely for illustrative purposes, FIG. 3 depicts schematically a closed-looped bridge having four terminal yoke connections at its junctions. The bridge arms are depicted as $a$, $b$, $c$ and $d$.

When balancing the bridge in accordance with the principles of the invention, a composite balance is achieved. That is to say, the arms of the bridge are balanced to provide a proper ratio in order to null an indicator meter M and, at the same time, contact and lead resistors such as 70', 71' and 72' are also balanced in the same ratio as the respective adjacent bridge arms. After the bridge is suitably balanced, a normally closed switch 14, shown schematically in FIG. 2 and in series with yoke resistance 70', may be opened without affecting the null of meter M or bridge balance. The purpose of switch 14 will become apparent hereinafter.

FIG. 2 depicts schematically the delta yoke connection at the junction of resistors $a$, $c$. Assume hereinafter with respect to FIG. 2 that switch 14 is closed. The delta of FIG. 2 can be converted into an equivalent Y, depicted in FIG. 4. Point 11 is the connection with the end of resistor $a$. The equivalent Y resistance $i$ is a series continuation of the resistance of resistor $a$. Point 12 is the connection to the end of resistor $c$. The equivalent Y resistance $j$ is a series continuation with resistor $c$. The equivalent Y resistance 73 is in series with point 13 and becomes a continuation of or part of the cross-arm of the bridge. Using four yokes at the junctions of the four bridge arm resistors $a$, $b$, $c$, $d$ and converting each delta yoke formed at such terminal junctions into resistive Y formations, one achieves the equivalent circuit of FIG. 5.

For the moment, it will be understood that each of the four bridge arms are of low resistance value to justify the four terminal yoke connections. By reason of the Y conversion, each bridge arm includes respective yoke resistances $i$, $j$, $k$, $l$, $m$, etc., in series therewith, which yoke resistances are the equivalent of the contact and lead wire resistances of the yoke connections. For example, resistor $a$ has contact and lead wire resistances $i$ and $l$ in series therewith, as shown, to form a total bridge arm resistance of $a'$. Resistor $c$ has contact and lead wire resistances $j$ and $n$ in series and at the opposite ends thereof to form a total bridge arm resistance of $c'$. Similarly, bridge arm $b'$ is made up of resistor $b$ in series with yoke resistances $k$ and $p$; and bridge arm $d'$ is made up of resistor $d$ in series with yoke resistances $o$ and $m$. The foregoing equivalent bridge is depicted in FIG. 5.

When all four main bridge arms of FIG. 5 are balanced, the ratio of the yoke resistances including all contact and lead resistances at any junction are in the same ratio to their respective sides; for example:

$$\frac{i}{j} = \frac{a+i+l}{c+j+n} = \frac{a'}{c'} \qquad (1)$$

The foregoing ratio is explained by the fact that for balance, the voltage potentials from junction 74 to junctions 11 and 12, respectively, are the same. Consequently, to maintain bridge balance, the current ratios through arm $a'$ and through arm $c'$ must be the same as that if resistance $i$ and $j$ were zero. With the addition of resistances $i$ and $j$ in series with their respective sides, the ratio of $i$ and $j$ should be the same as the ratio of the total resistance of the two arms if the same current ratios are to be maintained to continue bridge balance. In other words, the proper current ratios between the currents through $a'$ and $c'$ and, thus, bridge balance is maintained if Equation 1 holds true.

Equation 1 may be written as:

$$\frac{i}{a'} = \frac{j}{c'} = H \qquad (2)$$

where symbol H is a ratio parameter. Similarly, it can be shown that:

$$\frac{n}{m} = \frac{c'}{d'}; \frac{n}{c'} = \frac{m}{d'} = G$$

$$\frac{o}{p} = \frac{d'}{b'}; \frac{o}{d'} = \frac{p}{b'} = F; \text{ and}$$

$$\frac{l}{k} = \frac{a'}{b'}; \frac{l}{a'} = \frac{k}{b'} = E \qquad (3)$$

where symbols G, F and E are ratio parameters as defined in Equation 3. From Equations 2 and 3, the yoke resistances can be relabeled and expressed as follows:

$i = Ha'$      $m = Gd'$
$j = Hc'$      $n = Gc'$
$k = Eb'$      $o = Fd'$
$l = Ea'$      $p = Fb'$      (4)

The bridge is shown in FIG. 6 in terms of the symbols set forth in Equation 4.

At balance of the bridge arms, the following obtains:

$$\frac{a'}{b'} = \frac{c'}{d'}; \text{ or } a' = \frac{b'c'}{d'} \qquad (5)$$

But, from FIG. 6:

$$a' = Ea' + a + Ha'$$
$$b' = Eb' + b + Fb'$$
$$c' = Hc' + c + Gc'$$

and $$d' = Fd' + d + Gd' \qquad (6)$$

Rearranging Equation 6 provides:

$$a = a'(1-E-H)$$
$$b = b'(1-E-F)$$
$$c = c'(1-H-G)$$

and $$d = d'(l - F - G) \qquad (7)$$

Substituting Equation 7 into Equation 5 provides:

$$a = \frac{bc}{d}\left(\frac{(L-F-G)(L-E-H)}{(L-E-F)(L-G-H)}\right)$$

$$a = \frac{bc}{d}\left[\frac{L-E-F-G-H+EF+EG+HF+HG}{L-E-F-G-H+EG+HF+GF+EH}\right]$$

Upon adding $(EH+FG-EH-FG)$ to the numerator provides:

$$a = \frac{bc}{d}\left[\frac{\begin{array}{c}l-E-F-G-H+EF+EG+HF+HG+\\FG+EH-FG-EH\end{array}}{l-E-F-G-H+EG+HF+FG+EH}\right] \qquad (8)$$

Defining the denominator in brackets of Equation 8 by D provides:

$$a = \frac{bc}{d}\left[\frac{D+HG+EF-FG-EH}{D}\right]$$

or $$a = \frac{bc}{d}\left[l + \frac{(H-F)(G-E)}{D}\right] \qquad (9)$$

The "error term" in bridge balance from Equation 9 is defined as:

$$\frac{(H-F)(G-E)}{D} \qquad (10)$$

In accordance with the principles of the invention, the direct reading ratio setting as contemplated herein is constructed to reduce the value of the "error term" $(H-F)(G-E)$, whereby bridge error becomes negligible.

FIG. 7 illustrates schematically, an embodiment of the invention. One arm of the bridge, depicted as $Zd$, includes a three terminal voltage divider 40 provided with a pair of input terminals 15, 16 and an output terminal 59. Voltage divider 40 is characterized by a selected value of fixed input impedance and a linear transfer ratio regulated by a six dial setting. Divider 40 has a six digit transfer ratio dial 54 for regulating the divider transfer ratio. The theory and operation of a bridge employing such voltage divider means as one arm of the loop bridge, is the subject matter of my co-pending application Ser. No. 195,680, filed May 18, 1962, now Patent No. 3,179,880, issued Apr. 20, 1965, and entitled "Impedance Measuring Apparatus." Reference may be made to said application for the basic theory and operation of the bridge as contemplated in FIG. 7.

The bridge arm $Zc$ in FIG. 7 serves as an arm of selected value of fixed resistance, whereas $Zd$ comprises the variable ratio arm. When the test resistors $Za$ and $Zb$ are characterized by values of low resistance, each will have a four terminal yoke connection; two for current and two for voltage. Symbols $I_1$ and $I_2$ depict the two current connections for resistor $Za$. Symbols $V_1$ and $V_2$ depict the two voltage connections for resistor $Za$. Similarly, resistor $Zb$ has two current connections $I_3$ and $I_4$, and two voltage terminals $V_3$ and $V_4$. The interconnection between the two test resistors $Za$, $Zb$ is a lead and compensation yoke resistance circuit. Current connections $I_2$ and $I_3$ are connected through a normally closed switch 17. The voltage connections $V_2$ and $V_3$ are connected through a series resistor yoke circuit comprising resistors 18, 19, 20 and 21. For the illustrative example, the values of the foregoing series resistors are: $R_{18}=100$ ohms; $R_{19}$ is a 1 ohm potentiometer; $R_{20}=90$ ohms; and $R_{21}=10$ ohms. The purpose of these resistors and the illustrative values thereof will become apparent in subsequent discussion.

The yoke formed between resistors $Za$ and $Zb$ is an expanded delta formation of the Y connection between resistors $a$ and $b$ of FIGS. 5 and 6. The ratio of the yoke resistances $l$ and $k$ to the values of the respective total bridge arm resistances of the bridge for bridge balance, is controlled by the ratio parameter E. Thus, as shown hereinbefore, at null, yoke resistances $l$ and $k$ will be divided between the two arms $Za$ and $Zb$ in the same ratio as the respective total values of such two arms.

Resistor 19 includes a movable tap contact 22 which connects through a contact terminal 58b of switch 58 to a null detector 23 in one of the bridge cross-arms. The other side of detector 23 is connected to the output terminal 59 of voltage divider 40.

In accordance with the principles of the invention, resistor $Za$ is connected through a lead and contact resistance compensation yoke arrangement to bridge arm $Zc$. This arrangement involves connecting current terminal $I_1$ through series resistors 24, 25 and 26 to a junction 27 at the upper end of arm $Zc$. For the disclosed example, the values of the foregoing series resistors are as follows: $R_{24}$ is a 1 ohm potentiometer; $R_{25}=10$ ohms; and $R_{26}=100$ ohms.

Potential terminal $V_1$ of resistor $Za$ is connected through a 1.1 ohm variable load compensation resistor 28 and a normally closed series switch 53 to junction 27. The delta yoke formed between resistor $Za$ and arm $Zc$ can be converted into the Y yoke as shown schematically in FIGS. 5 and 6, which in said figures said yoke appears between resistors $a$ and $c$. This yoke formation would divide the contact resistances and other series resistances comprising the total $i$ and $j$ by the ratio parameter H. Thus, at a null, the yoke resistances $i$ and $j$ are placed in the appropriate bridge arms to maintain the total bridge arm ratio $a'$ to $c'$ to maintain bridge balance.

The invention also contemplates a second yoke between the $Zb$ and $Zd$ arms. The potential terminal $V_4$ of resistor $Zb$ is connected through a series circuit of a load compensation resistor 29 of 0.05 ohms and a normally closed switch 30 to a junction 31 at the lower end of arm $Zd$. Current terminal $I_4$ of resistor $Zb$ is connected through added lead and contact compensation series resistors 32, 33 and 34 to junction 31. The illustrative values of the aforesaid series resistors are: $R_{32}$ is a 1 ohm potentiometer; $R_{33}=10$ ohms; and $R_{34}=100$ ohms. The total yoke formed between resistors $Zb$ and $Zd$, shown in delta formation in FIG. 7, may be converted to an equivalent Y as shown in FIGS. 5 and 6. This yoke is between resistors $b$ and $d$ of FIGS. 5 and 6, and the ratio of total resistances $p$ and $o$ to the correlated bridge arms $b'$ and $d'$ will be in accordance with the ratio parameter F.

A normally opened shorting switch 35 is placed in parallel across the series connected bridge arms $Zc$ and $Zd$. Switch 35 is connected between junctions 27 and 31.

From FIG. 6, ratio parameter G is formed by the yoke between bridge arms $c'$ and $d'$. The actual bridge circuit of FIG. 7 does not use a four terminal yoke between arms $Zc$ and $Zd$. As illustrated hereinafter, the resistance values of $Zc$ and $Zd$ are established very accurately by self-calibration means incorporated in the bridge circuit. Furthermore, the resistance values of arms $Zc$ and $Zd$ are each relatively large. These factors eliminate the need of a four terminal connection between arms $Zc$, $Zd$. As a result, the connection between these two arms is a conventional two terminal connection, as depicted in FIG. 7, thereby reducing the ratio parameter G to a value of zero. When the parameter G is equal to zero, the "error term," Equation 10, becomes:

$$-E-(H-F)/D \qquad (11)$$

In order to eliminate completely the error in bridge balance, the invention contemplates reducing Equation 11 to zero by making H equal to F.

Resistor 24 is a variable resistor with a tap arm 36 at its output. Resistor 32 is a similar variable with a tap arm 37 at its output. A voltage source, such as battery 38, is connected between output taps 36, 37. This last circuit comprises the second cross-arm of the bridge.

In order to obtain a direct reading ratio set characterized by a 1:1 range and, in particular, keeping within the parts per million accuracies as contemplated herein, the values of arms $Zc$ and $Zd$ should be exactly equal. In the illustrated embodiment, the value of $Zc$ is selected to be 100 ohms. The value of $Zd$ is selected to be a variable resistance in the range of 100 ohms, and which can be set to equal $Zc$ exactly. Voltage divider 40 serves as the variable arm for the ratio set. The input impedance of divider 40 is selected to be a fixed value of 100,000 ohms. A precision and highly stable matching resistor 41 is selected to have a value equal to the input impedance of divider 40, hence a value of 100,000 ohms is connected in series with divider 40. A resistor 42 is connected in parallel across the series combination of divider 40 and matching resistor 41. Resistor 42 is shunted by a fixed resistor 43 in series with a variable trimmer resistor 44. The parameters for resistors 41, 42 and 43 are selected to provide a stable precision resultant resistance of 100 ohms. Trimmer 44 provides an adjustment whereby the resultant value of $Zd$, terminal 15 to junction 31, exactly equals $Zc$. Consequently, the $Zd$ bridge arm, that is to say, from terminal 15 to junction 31 is essentially a combination of 200,000 ohms in parallel with 100 ohms which is effectively 100 ohms. By means of such arrangement, a variation of the dial setting of the six dial voltage divider 40 provides readings of values directly in parts per million.

The fixed resistance arm $Zc$ is made up of a precision and high stability resistor 39 having a selected value of 100 ohms in parallel with a precision resistor 45 selected to have a value of 200,000 ohms. Thus, the combination making up $Zc$ will match exactly the value of $Zd$. Any mismatch occurring between these two arms is eliminated by adjustment of trimmer 44.

It will be noted that yoke resistances 25, 26 are provided with respective shorting switches 25a, 26a. Similarly, resistances 33, 34 are provided with respective shorting switches 33a, 34a. As seen hereinbefore, $Zc$ and $Zd$ have values in the order of 100 ohms each. Assume that $Za$ of 10 ohms is being compared to $Zb$ of 10 ohms. To satisfy the bridge balance equations, in particular Equation 1, the yoke resistance ratio $i/j$ and $p/o$ for the foregoing measurement should be divided by a ratio 1:10 at both junctions. This requires loading the two yokes at the foregoing ratio and is accomplished by shorting out resistors 26, 34 while retaining resistors 25, 33. If one were to compare $Za$, $Zb$ having resistances in the order of 1 ohm each, the yoke resistances should be divided at a 1:100 ratio. This is provided by shorting out resistances 25, 33 and retaining resistances 26, 34 in the circuit.

The direct reading ratio set of FIG. 7 is also capable of providing a 10:1 range by means of a series of ganged switches 49, 50, 51 and 52, as disclosed in FIG. 7. The conversion also requires the addition of suitable matching resistors in the circuit as follows. In the bridge arm $Zc$, a precision and highly stable resistor 46 having a selected value of 1,000 ohms is connected across resistor 39 and a resistor 47 having a selected value of 1.1 megohms is connected across resistor 45. In the bridge arm $Zd$, a matching resistor 48 selected to have a value of 10,000 ohms is connected across resistor 41. Switches 49 to 52 are provided with correlated switch terminals $r_2$ and $r_2$. When switches 49 to 52 contact respective terminals $r_1$, the 1:1 range is obtained. Switch 52 is connected to the dummy contact terminal $r_1$, thereby maintaining resistor 20 in the series circuit of the $Za$–$Zb$ yoke, whereby the 90-ohm resistor 20 is in series with the 10-ohm resistor 21 to provide a resultant 100 ohms to maintain a 1:1 ratio with the 100-ohm resistor 18. Potentiometer 19 serves as a trimmer.

When the ganged switches 49 to 52 are moved to their respective terminal positions, $r_2$, the circuit now provides the 10:1 range. For this switching position resistor 20 is shorted out and resistors 39, 41 and 45 are inactive and resistors 46, 47 and 48 are in their respective circuits. However, a further adjustment is required to provide the 10:1 range. For example, for the 10:1 range, $Zc$ is in the order of 1,000 ohms and $Zd$ is in the order of 100 ohms. Suppose the ratio set is operated to compare $Za=10$ ohms and $Zb=1$ ohm, this requires a yoke resistance division at the upper and lower junctions of 1:100. That is to say, $i/j$ and $p/o$ should be divided into the ratios of 1:100. By shorting out resistors 25, 33 and retaining resistors 26, 34, the foregoing distribution of yoke resistances are obtained. If one is comparing $Za=100$ ohms to $Zb=10$ ohms, resistors 26, 34 are shorted out and resistors 25, 33 are retained.

In order to achieve the high level of accuracy and precision as contemplated herein, the direct reading ratio set is calibrated to provide a precise ratio value for $Zc$ and $Zd$. For example, when the system is used for the 1:1 range, the value of $Zc$ should be exactly equal to the value of $Zd$ and when operating in the 10:1 range, the ratio of these two bridge arms should be exactly equal to 10:1. One method for providing such precision bridge arm calibration includes selecting two extremely precision standard resistors at least substantially equal in value and placing them interchangeably in the positions of $Za$ and $Zb$, wherein the bridge is repeatedly balanced until the bridge null meter 23 indicates a constant reading. This technique, however, is not completely satisfactory because the contact and lead resistance yokes would still provide slight inaccuracies whenever the two standard resistances are interchanged between positions $Za$ and $Zb$.

FIG. 7 illustrates a technique for self-calibration incorporated into the bridge. A pair of precision standard resistors 55 and 56, each 10,000 ohms in value, are in series across junctions 27, 31. A lead connection 57 from the mid-point between resistors 55, 56 connects to switch contact terminal 58a. It will be understood when switch 58 contacts its terminal 58b, the bridge circuit operates as a comparison set for measuring a resistor $Za$ against $Zb$. When switch 58 is moved to position 58a, resistors 55, 56 serve as the calibrating bridge arms. The other two arms are the actual bridge arms $Zc$ and $Zd$ which are now being calibrated. Movement of switch 58 and 58a puts meter 23 in series between divider output 59 and the mid-point of resistors 55, 56. The high resistance value of the 10K resistors 55, 56 eliminates the need for using four terminal connections thereat. Accordingly, the entire calibration circuit comprises standard two terminal connections. Divider dial 54 is set either for 1 or 0 depending upon the polarity of terminals 15, 16 in the circuit. Let us assume that divider terminal 15 is the high side and divider terminal 16 the low side and the divider input is hooked into the circuit as shown in FIG. 7. Divider transfer ratio dial 54 is then set for 1. The bridge is balanced by adjusting trimmer 44. After null is indicated, resistors 55, 56 are interchanged and battery 38 is reversed. This is achieved by ganged switches 60, 61 and 62, 63. Switches 60, 61 are at the opposite ends of battery 38. Switches 62, 63 are at the outer ends of resistors 55, 56. By reason of operation of these switches, resistor 55 is now at position 56 and resistor 56 is now at position 55. The negative terminal of battery 38 is at the upper end and the positive terminal of battery 38 is at the lower end. The meter indicator is observed. Meter 23 will indicate the same reading as the previous null if resistors 55, 56 are exactly equal and if $Zc$ is exactly equal to $Zd$. On the other hand, if meter 23 reading has changed from the first null position, the change or deviation will be small. Trimmer 44 is adjusted to reduce the observed deviation from the prior null reading to about one-half. Switches 60–63 are again actuated to interchange resistors 55, 56 and reverse battery 38 to return same to the status shown in FIG. 7. The meter indication is again observed to note if there is a deviation from the last adjusted reading. If a deviation still exists, trimmer 44 is again adjusted to reduce the deviation to about one-half from the last adjusted reading. Once again, resistors 55, 56 are interchanged and battery 38 is reversed by switches 60–63. This procedure is repeated until the meter reading remains constant for two successive readings. When such status is reached, $Zc$ exactly equals $Zd$ even if the absolute values of resistors 55, 56 are slightly different.

The foregoing calibration of $Zc$ and $Zd$ was carried out without disturbing in any way the four terminal yoke connections of resistors $Za$ and $Zb$. As a matter of fact, the actual resistors to be compared may be in their respective positions of $Za$ and $Zb$ while calibrating $Zc$ and $Zd$. Consequently, it is seen that one major advantage of the foregoing calibrating circuit is that the low value resistors $Za$ and $Zb$ and the yokes thereof are essentially isolated from and remain constant during calibration of $Zc$ and $Zd$.

It is the purpose of the system to compare a high precision resistor with a precision standard of known value, where $Za$ or $Zb$ may be the unknown and the other the known standard. If these resistors are not already in the circuit while $Zc$ and $Zd$ are being calibrated, they are now inserted therein. The bridge is now balanced to determine the value of the unknown with respect to the standard.

The foregoing described calibration satisfies the values of $Zc$ and $Zd$ for a 1:1 range operation. Calibration of the $Zc$ and $Zd$ arms for the 10:1 range is automatic for the following reason. The precision and high stability resistor constituting the 100-ohm $Zc$ resistor 39 is actually made up of a series-parallel combination of ten precision and highly stable 100-ohm resistors. The same ten resistors are used to constitute the precision and high stability 1,000-ohm $Zc$ resistor 46 when switch 59 moves to its position $r_2$. This arrangement automatically provides an accurate ratio of $Zc=10Zd$ for the 10:1 range after the arms are calibrated for $Zc=Zd$ for the 1:1 range. The technique of employing series-parallel combination of precision and high stability resistors to make up both the 100-ohm resistor 39 and the 1,000-ohm resistor 46 is known in the art.

After calibrating $Zc$ to equal $Zd$, switch 58 is returned to contact 58$b$. The set position of trimmer 44 is not disturbed during the subsequent bridge balancing and measuring operation. The resistors $Za$ and $Zb$ are in their bridge positions. The ratio divider dial 54 is set to provide a transfer ratio of 1.0.

The first bridge balance step involves balancing the bridge for null by adjusting dial 54 until meter 23 indicates a null. The null setting for dial 54 is not disturbed for the remaining sequence of four steps.

The second bridge balance step involves balancing the voltage ratio yoke between arms $Za$ and $Zb$. Switch 17 is temporarily opened. If a perfect bridge balance exists at this yoke, then the yoke impedances at this junction are properly divided in the same ratio as the respective bridge arms to which the yoke is connected, whereby opening of switch 17 will not cause a bridge unbalance. On the other hand, if meter 23 indicates an unbalance upon opening switch 17, potentiometer arm 22 is regulated to restore bridge balance. Switch 17 is then returned to closed status; arm 22 remains at its last set position, and the third bridge balance step is made.

The third step involves temporarily closing switch 35 to short out arms $Zc$ and $Zd$. A normally opened switch 35$a$ is also temporarily closed to insert meter M in the bridge loop described hereinafter. This temporarily establishes a bridge loop made up of $Za$ and $Zb$ (the resistors under comparison) and the upper and lower yoke impedances, depicted by elements $j$ and $o$ in FIG. 5. If a perfect balance exists, it means that $H=F$, otherwise, a small meter deviation from balance will be observed, whereby potentiometer 28 is adjusted and set to return the bridge to balance as indicated by meter 23, and then switch 35 is opened for the next step. When the bridge is balanced for the four main arms:

$$a'/b'=c'/d' \quad (12)$$

If the bridge is also balanced when switch 35 is shorted, then:

$$a'/b'=j/o \quad (13)$$

But, the last equation holds if $H=F$, because by combining Equations 12 and 13: $c'/d'=j/o$ and transposing $o/d'=j/c'$, where the left-hand term equals F and the right-hand term equals H.

The fourth step involves balancing the lower yoke between $Zb$ and $Zd$. Switch 30 is temporarily opened. If meter 23 indicates an unbalance by reason of opening switch 30, balance is restored by adjusting potentiometer arm 37. Potentiometer 37 remains at the set position and switch 30 is returned to closed status.

The fifth balancing step is substantially similar to the fourth, except it involves balancing the upper yoke between arms $Za$ and $Zc$. This is checked out by opening switch 53 and balancing the bridge by regulating potentiometer arm 36, after which switch 53 is closed.

It will be understood that the fourth and fifth steps are essentially balancing the respective upper and lower yokes to provide the proper yoke impedance ratios, as noted with respect to the discussion concerning FIGS. 2 and 4. For balance at these junctions, the potentials from junction 74 to junctions 11 and 12 are equal, assuming the null meter M is bridging arms $a$ and $c$ as shown in FIG. 3. Hence, the drop from junction 13 to junctions 11 and 12 are equal at bridge balance in accordance with the ratio formula of Equation 1. Consequently, at balance, opening and closing of switch 14 (FIG. 2) will not disturb the null indication. In the circuit of FIG. 7, if the upper and lower yokes are in proper ratios, opening and closing switches 30 and 53 will not disturb bridge balance.

After going through steps 1 to 5, it is preferable to repeat the bridge balance sequence at least once more. For example, the last setting of dial 54 is adjusted should meter 23 indicate a null deviation to return the bridge to balance. Then, steps 2 through 5 are repeated as outlined hereinbefore.

The foregoing sequence of steps is one of a variety of balancing sequence steps that may be made. An example of another sequence for balancing the bridge of FIG. 7 consists of steps 1 and 2 as described hereinbefore, then followed by steps 4 and 5, and then concluded by step 3, which consists of closing shorting switch 35 and adjusting for bridge balance, if required, by regulating potentiometer 28.

The final reading of dial 54 indicates the ratio between $Za$ and $Zb$. For example, if $Za$ (the precision standard) is exactly 10 ohms and $Zb$ is 9.99998 ohms, the dial will read 999998. If $Za$ and $Zb$ were reversed, the arms $Zc$ and $Zd$ would have to be reversed since divider 40 does not provide negative readings. When negative readings are indicated, arms $Zc$ and $Zd$ are interchanged by ganged switches 64, 65. Note, these switches are at the outer ends of the high impedance elements of arms $Zc$ and $Zd$. When these switches are operated, resistor 45 or 47, as the case may be, is flipped into arm $Zd$ across the 100 ohms combination including resistor 42; and the series combination of divider 40 and resistor 41 or resistor 48, as the case may be, is flipped into arm $Zc$ across resistor 39 or 46, as the case may be, so as to provide positive readings of the divider to balance the bridge. The other alternative would be to interchange arms $Za$ and $Zb$, but then the bridge has to be rebalanced.

The foregoing circuit may be used to provide a direct reading of the absolute deviation of the resistor under test, for example, $Zb$ from the precision standard $Za$. In the above example the deviation was .00002 ohm. This merely requires hooking divider 40 into its circuit in reversed polarity. For the above example, it was assumed that terminal 15 was the high potential side of divider 40 and terminal 16 was the low potential side. Note, that junction 27 is the high potential side by reason of the illustrated battery polarity. On the other hand, if the high side of divider 40 is at terminal 16 and its low side is at terminal 15, and divider dial 54 is set at 000000 for bridge calibration of $Zc=Zd$ and for the start of the first step of main bridge balance, the final reading of divider dial 54 will read directly the difference between $Zb$ and $Za$, i.e. 0.00002. Such use of divider 40 is accurate for situations where a precision resistor, such as $Zb$, is being calibrated against a known precision resistor and the deviation will be less than 1,000 p.p.m., i.e. 0.001 ohm. Accordingly, we see a further advantage of the foregoing invention, wherein the three terminal divider may be used to read directly the exact difference of the unknown with respect to the precision standard.

The direct reading ratio set of FIG. 7 incorporates upper and lower yokes between $Za$–$Zc$, and $Zb$–$Zd$. These yokes introduce two corrective circuits into the system to eliminate bridge unbalance inaccuracies. The individual elements of the yoke networks are automatically divided up in proper ratios while the bridge is being balanced as arm $Za$ is being compared to arm $Zb$ to eliminate contact, lead and load resistance inaccuracies. In the last analysis, these individual yoke elements form composite networks, whereby the bridge "error term" of the balance Equation 11 reduces to zero. Furthermore, should variations in lead, contact or load effects arise during the actual bridge balancing operation at any of the sensitive junctions, these yokes continuously apportion such spurious effects in proper ratios with respect to correlated bridge arms while bridge arms are being balanced to sustain bridge operation free of error, whereby reliable bridge measurements in the order of 1 p.p.m. are maintained. It will also be noted, that resistors $Za$, $Zb$ and the other sensitive low resistance elements of the bridge remain physically constant during bridge calibration and balancing operation. This is a further advantage of the system because it avoids bridge balance errors due to lead, contact and load resistance variations, which occur when such sensitive portions of the bridge are physically changed.

It is intended that all matter contained in the above description or shown in the accompanying drawings shall be interpreted as illustrative and not in a limiting sense.

What is claimed is:

1. The method of measuring an impedance in a bridge comprising:

four bridge arms, a pair of bridge cross arms, power source means and null indicator means in respective bridge cross arms, terminal ends connected to the ends of said bridge arms, means including first, second and third impedance networks in delta array for providing respective bridge loop junctions, said first and second networks having respective equivalent Y impedances $j$ and $o$ and junctions for interconnecting correlated pairs of bridge arms and for connecting a correlated cross arm, adjacent terminal ends of first and second of said bridge arms being interconnected by said first delta network, adjacent terminal ends of third and fourth of said bridge arms being interconnected by said second delta network, said first and second delta networks also being connected to a first of said cross arms, adjacent terminal ends of said first and third bridge arms being interconnected by said third delta network, one of said first and third bridge arms being an impedance under measurement, the impedances of said second and fourth bridge arms being $c'-j$ and $d'-o$ respectively, the said second and fourth arms and the said Y impedances of their connected delta networks having the ratio parameters $$H=\frac{j}{c'} \text{ and } F=\frac{o}{d'}$$

means connecting adjacent terminal ends of said second and fourth bridge arms, a voltage divider providing a substantially constant impedance and having a pair of input terminals connected across one of said second or fourth bridge arms, said voltage divider also having a variable transfer ratio and an output terminal, means for connecting the other bridge cross arm between said voltage divider output and said third delta network, switching means for applying temporarily a short circuit across said second and fourth bridge arms, and variable impedance means in at least one portion of said first and second delta networks for adjusting the balance of said temporary bridge so that the ratio parameters $(H-F)=0$;

including the steps of:

(1) first balancing the bridge by varying the transfer ratio of said voltage divider until said null indicator means indicates a null, and (2) temporarily closing said switching means and adjusting the said variable impedance means of at least one of said first and second delta networks until a null is obtained and $H=F$.

2. The method of claim 1 in which the said third delta network also comprises adjustable impedance means and switching means, the step of the opening and closing of said second mentioned switching means and the adjusting of its adjustable impedance means until the opening and closing of its switching means retains the bridge balance as shown by a null on the null indicator means.

3. The method of claim 1 in which the said first and second delta networks each has adjustable impedance means and switching means in each of the delta networks, the steps of the opening and closing of the switching means of the first delta network and the adjusting of its adjustable impedance means until the opening and closing of its switching means retains the bridge balance as shown by a null on the null indicator means, and the opening and closing of the switching means of the second delta network and the adjusting of its adjustable impedance means until the opening and closing of its switching means retains the bridge balance as shown by a null on the null indicator means.

4. The method of claim 1 in which the bridge also includes a pair of series connected resistances each having an outer terminal end and each having impedance values very much greater than the impedance values of any one of the four bridge arms, means for connecting said outer terminal ends of said series connected resistances to respective terminal ends of said second and fourth bridge arms for forming a calibrating bridge, and means for balancing said calibrating bridge for establishing equal impedance values for said third and fourth bridge arms.

References Cited

UNITED STATES PATENTS

| | | | |
|---|---|---|---|
| 1,665,397 | 4/1928 | Wunsch | 324—62 |
| 2,589,758 | 3/1952 | Wojciechowski | 324—57 |
| 2,954,929 | 10/1960 | Dennis | 323—75 XR |
| 3,179,880 | 4/1965 | Julie | 324—57 |
| 3,249,866 | 5/1966 | Barr et al. | 324—62 |

RUDOLPH V. ROLINEC, *Primary Examiner.*

WALTER L. CARLSON, *Examiner.*

E. E. KUBASIEWICZ, *Assistant Examiner.*

UNITED STATES PATENT OFFICE
CERTIFICATE OF CORRECTION

Patent No. 3,341,773                          September 12, 1967

Loebe Julie

It is hereby certified that error appears in the above numbered patent requiring correction and that the said Letters Patent should read as corrected below.

Column 3, lines 6, 8, 64, 66, 68, 70 and 74, column 4, line 3, column 5, line 72, column 6, lines 23 and 43, and column 11, lines 50 and 66, for "Y", each occurrence, read -- wye --; column 3, line 17, for "suprious" read -- spurious --; column 4, line 29, for "resistance" read -- resistances --; same column 4, lines 72 to 74, and column 5, lines 1, 12, 14 and 23, for the lower-case letter "l", in italics, each occurrence, read figure -- 1 --; column 5, lines 4, 5, 6 and 7, for "L" read -- 1 --; column 6, line 64, for "-E-(H-F)/D" read -- $\frac{-E(H-F)}{D}$ --; column 7, line 61, for "$r_2$" read -- $r_1$ --.

Signed and sealed this 5th day of November 1968.

(SEAL)
Attest:

EDWARD M. FLETCHER, JR.                        EDWARD J. BRENNER
Attesting Officer                             Commissioner of Patents